United States Patent
Searby et al.

[11] Patent Number: 5,412,402
[45] Date of Patent: May 2, 1995

[54] ELECTRONIC GRAPHIC SYSTEMS

[75] Inventors: Anthony D. Searby; Paul R. N. Kellar, both of Newbury, England

[73] Assignee: Quantel Limited, Newbury, England

[21] Appl. No.: 665,597

[22] Filed: Mar. 6, 1991

Related U.S. Application Data

[63] Continuation-in-part of Ser. No. 576,647, Aug. 31, 1990, Pat. No. 5,142,616.

[30] Foreign Application Priority Data

Jan. 31, 1991 [GB] United Kingdom ............... 9102084

[51] Int. Cl.6 ........................................ G09G 5/04
[52] U.S. Cl. .................................. 345/153; 345/173
[58] Field of Search .............. 340/706, 712, 721, 701, 340/703, 710, 723, 724, 798, 799; 358/22; 345/156, 173, 150, 153, 199, 186

[56] References Cited

U.S. PATENT DOCUMENTS

| | | | |
|---|---|---|---|
| 4,345,313 | 8/1982 | Knox | 364/515 |
| 4,514,818 | 4/1985 | Walker | 340/710 |
| 4,602,286 | 7/1986 | Kellar et al. | 358/22 |
| 4,633,416 | 12/1986 | Walker | 340/798 |
| 4,775,858 | 10/1988 | Stapleton et al. | 340/724 |
| 4,901,063 | 2/1990 | Kimura et al. | 340/723 |
| 4,949,180 | 8/1990 | Miles | 340/723 |
| 5,142,616 | 8/1992 | Kellas et al. | 395/135 |

FOREIGN PATENT DOCUMENTS 0202747 11/1986 European Pat. Off. .
9115830 10/1991 WIPO .

*Primary Examiner*—Richard Hjerpe
*Attorney, Agent, or Firm*—Cooper & Dunham

[57] ABSTRACT

An electronic graphic system for use in the painting of an image comprises a control store which stores control data representing a distribution of interpolation coefficients. The control data is created in a drawing process in which existing control data in the store is compared with new control data and is replaced with the new data when the new data has a value higher than that of the existing data. A combiner, in response to the stored control data, combines initial image data from an framestore with user selected color data from a store for display on a monitor. Also, the combiner can be reconfigured such that the combined data is written to the framestore replacing the initial image data therin. The system thus separates drawing operations from image modification operations, thereby providing a flexible means by which a simple binary line drawing algorithm can be used to paint into a color image.

30 Claims, 1 Drawing Sheet

ELECTRONIC GRAPHIC SYSTEMS

This application is a continuation-in-part of U.S. application Ser. No. 07/576,647, filed Aug. 31, 1990, (now U.S. Pat. No. 5,142,616).

The invention relates to an electronic graphic system.

BACKGROUND OF THE INVENTION

In electronic graphic systems the painting or drawing of an image can be simulated by electronic means. Several different processing techniques by which data representing a painted image is written into a memory are now well established. In most techniques the user is provided with a choice of notional painting or drawing implements, such as a paintbrush, a pencil or an airbrush for example, and manipulation by the user of an input device such as a stylus and touch tablet results in the painting of an image. The painted image is usually displayed on a monitor with new strokes and lines being added to the display substantially in real time. In this way the effect of manipulating the stylus is seen apparently instantaneously thereby adding realism to the painting performed by the user.

An early technique sometimes used for painting an image into a memory is the so-called Z-paint algorithm. A painting implement, hereinafter called "brush", is defined by data values Z for a patch of pixels. The Z-values may denote different colours on a colour map or different intensities on a grey scale. Further Z values are associated with the various pixels of the image memory, representing either an initial background image or values resulting from previous paintings. As painting progresses, for each instantaneous position of the brush the Z values of the brush pixels are compared with the Z values of corresponding image pixels and the brush pixels replace the image pixels in the image store if the brush Z values are the greater than those of the image pixels, but leave the image pixel Z values unchanged otherwise. A "yes-no" choice is made for each image pixel inserted by the brush and therefore Z-paint can be described as a binary algorithm.

This technique enables the user to paint lines having pixels of varying colours or varying shades of grey. However, this approach has the disadvantage that the lines which are painted exhibit jagged edges due to the sampling which is inherent in the technique and some methods of reducing this disadvantage are described in an article by Turner Whitted in Computer Graphics, Volume 17, Number 3, July 1983, entitled Anti-aliased line drawing using brush "extrusion".

One of these methods is to paint on a neutral background initially composed of pixels of a uniform and minimum Z value (black) with a filtered high resolution brush. The pixels of the brush have Z values which decrease from the centre of the brush toward the edge, and as the brush is moved along a high resolution path the final intensity of grey painted by the brush decreases with perpendicular distance from the path. As described in the article, the fact that the brush is positioned with a higher resolution than that of the pixels of the background image, together with the grey "shading", will make jagged edges less noticeable. Nevertheless the method has the disadvantage that lines have to be drawn as isolated images and later incorporated with the desired background image, which would presumably be different from the neutral background on which the lines are drawn, as a separate step. Consequently the user cannot observe the effect of painting in real time.

The use of an "extrusion" brush is also proposed in the article to reduce the problem of jagged edges while at the same time enabling the user to observe the effect of painting in real time. In this brush extrusion technique the filtered high resolution brush is represented by a set of values ascribed to a single line of pixels perpendicular to the direction of motion of the brush. The brush values in this case are not Z values but interpolating coefficients to control merging of user selected brush colours with the colour of the background image at corresponding background pixels identified by the positioning of the brush. The coefficients have maximum values for pixels at or near the longitudinal axis of the line being drawn and decline in value with increasing distance from the axis. The coefficients for the line of pixels have to be generated anew for each brush position along a stroke and this is done by summing precalculated values derived from a circularly symmetrical brush along lines parallel to the direction of brush movement, at each brush position.

The brush extrusion technique described in the preceding paragraph generates a representation of the distribution of interpolating coefficients required to interpolate a line of the selected colour into the background image. The representation has of course to be generated in advance of the interpolation. Advantage is taken of the fact that the line is generated in successive small segments corresponding to the transverse line of pixels by which the brush is represented. A cache store is provided in which the coefficients for each segment are written as they are generated. When the brush is moved to it's next position, the coefficients for the previous segment are read from the cache store and fed to an interpolator where the user selected colour is merged, pixel by pixel within the segment, with colours read from the corresponding pixels in the image store. The resultant modified image pixel values are then written back to the image store. The image store is also serially read to a display monitor on which the user can observe instantly in real time, the effect of his painting. The use of interpolation under control of the brush coefficients has the advantage of reducing significantly the appearance of jagged edges.

If it is desired to use the Z-paint algorithm together with the extrusion brush technique, the brush pixels must be provided with Z values separate from the interpolation coefficients. The extrusion brush technique reduces the problem of jagged edges, but introduces another problem, namely that the extrusion brush tends to produce unacceptable effects at the beginning and end of a drawn line. It may also produce discontinuities between line segments, especially if the direction of movement of the brush changes along the length of the line.

Prior to the Turner Whitted paper we proposed our own system for reducing the problem of aliasing in an electronically created image. In our solution we define a brush or other drawing implement as a patch of pixels. The patch of pixels defines a continuous three-dimensional shape representing the distribution round the centre of the implement, which shape has a high central region and decreases in height to the edge of the shape. As the user manipulates an input device, such as a stylus and touch tablet, co-ordinate positions are generated representing the instantaneous position of the brush on an image as stored in a memory. For each co-ordinate position a patch of image pixels is read from the memory, modified by combining the pixels with corresponding pixels in the brush such that the resulting pixels are a weighted combination of the image pixels and the brush pixels, and then writing the resulting pixels back into the memory to replace the pixels previously there. This approach is disclosed in detail in our British Patent No. 2,089,625 and corresponding U.S. Pat. No. 4,514,818, the teachings of which are incorporated herein by reference. The systems disclosed in these patents are able to paint substantially non-aliased lines and therefore provide for realistic painting in an electronic environment.

In our British Patent No. GB 2,113,950 and corresponding U.S. Pat. No. 4,602,286, the teachings of which are incorporated herein by reference, we disclose a graphic system which enables a foreground image or a portion thereof to be merged into a background image. In this system, a control image is created for example by painting a one-dimensional or monochrome image into a framestore. The control image defines a mask or stencil with graduated edges and the user is free to experiment with the form of the stencil and with spatial transformations or movements of stencil and the foreground image on the background image by manipulation of a stylus and touch tablet for example. In a trial and error phase, the foreground and background images can be combined with the aid of the control image so that the user can observe the potential effect on a monitor. Once the user is satisfied with the effect, the foreground image is selectively committed to the background image using the control image as an interpolation coefficient on a pixel by pixel basis, the resultant combination replacing the initial background image.

SUMMARY OF THE INVENTION

The present invention resides in the realization that greater flexibility can be achieved by separating data representing drawings made by a user from data representing an original image until such time as a satisfactory result has been observed in a preview derived from the separate data.

The present invention also resides in the realization that by providing two separate stores, one containing an initial image to be modified and the other containing control data representing user defined modifications to be made to the initial image, painting can be made highly flexible with the user being able to observe modifications before they are committed to the initial image.

The present invention provides a flexible means by which a simple line drawing algorithm for example a binary line drawing algorithm (as defined hereinabove) can be used to paint into a colour image.

According to one aspect of the present invention there is provided an electronic graphic system for use in modifying data defining an image, in which system control data representing a desired distribution of interpolation coefficients is created and stored in a control store by way of a process in which existing control data in the control store is compared with new control data created in response to manipulations of user operable input means and is replaced with the new data when a predetermined relationship is found between the new data and the existing data, the control data being used to control the combining by interpolation of data representing a user selected colour with data representing an initial image held in an image framestore separate to the control store, and the combined data being output for display of a modified image represented thereby on a monitor, the system being arranged such that the initial image data remains unmodified until such time as the user indicates his satisfaction of the displayed image.

According to another aspect of the present invention there is provided a method of modifying data defining an image, the method comprising: creating control data representing a desired distribution of interpolation coefficients and storing said control data in a control store by way of a process in which existing control data in the control store is compared with new control data created in response to the manipulation of user operable input means and is replaced with the new data when a predetermined relationship is found between the new data and the existing data; selecting a colour; combining the image data with data representing the selected colour in accordance with the control data; displaying an image derived from the combined image and colour data; and updating the image data with the combined data once acceptable modifications have been effected to the displayed image.

The present invention also provides an image processing apparatus comprising:
  an image framestore for storing data defining an initial image to be modified;
  a control image framestore for storing data defining a control image;
  storage means for storing data representing a user selected colour;
  user operable input means responsive to user manipulations for generating implement data representing a notional drawing implement selected by the user and co-ordinate data representative of the position of the notional implement on the control image;
  comparing means for comparing the implement data with control image data identified by the co-ordinate data and for replacing the control image data with the implement data if a predetermined relationship exists therebetween; and
  a combiner responsive on a pixel by pixel basis to the control image data for combining by interpolation the colour data with the initial image data for display as a modified image on a monitor, and for effecting corresponding modifications to the initial image data in the image framestore in response to a user selected command to commit the modification to memory.

According to a further aspect of the invention there is provided a graphics system having facilities for using a binary algorithm for painting with a circularly symmetric brush so as to generate a representation of a desired distribution of interpolation coefficients, the system comprising:
  first store means for storing the representation of the desired distribution;
  a source of data representing an artist selected colour;
  second store means for storing a representation of an initial background image;
  reading means for serially reading the representations in said first and second store means;
  interpolating means for combining by interpolation the artist selected colour data with pixels of said background image representation in proportions determined by respective coefficients of the desired distribution;
  monitor means for displaying the representation resulting from the combination; and user operable means for writing the displayed representation in said second store means.

It should be understood that the use of an algorithm for painting with a circularly symmetric brush substantially avoids the abovementioned line-beginning and line-end-effects and discontinuities which are encountered on using a transverse line brush. Furthermore, the use of a binary algorithm simplifies the "painting" process whereas using the interpolating means as a combiner allows the effects of painting to be observed effectively in real time, without any overwriting of the initial background image in the second framestore until the artist elects to commit what he has "painted" to the background image.

Preferable said binary algorithm is Z-paint.

The present invention thus provides a system in which painting or drawing operations are separated from image modification operations, thereby enabling a wider range of drawing techniques to be used than has hitherto been possible.

It should be appreciated from the foregoing that the present invention may be used to utilise a combination of features separately known in a variety of other proposals to reduce the disadvantages of systems such as disclosed in the Turner Whitted article.

BRIEF DESCRIPTION OF THE DRAWING

The above and further features of the invention are set forth with particularity in the appended claims and together with advantages thereof will become clearer from consideration of the following detailed description of an exemplary embodiment of the invention given with reference to FIG. 1 which shows a schematic block diagram of a system embodying the invention.

DESCRIPTION OF THE PREFERRED EMBODIMENT(S)

Figure 1:
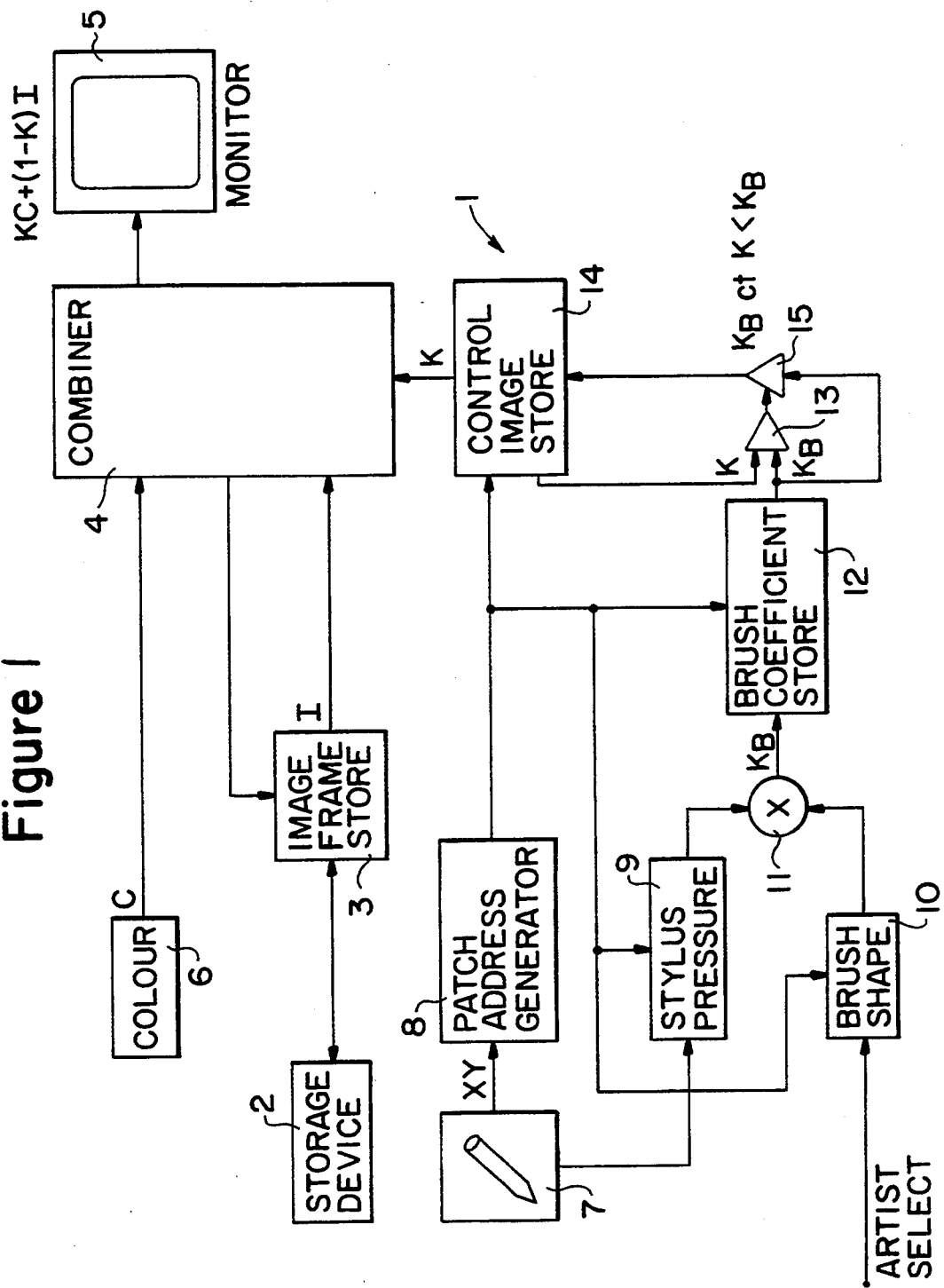

Referring now to FIG. 1, an electronic graphic system, generally indicated at 1, comprises a bulk storage device 2 for storing data relating to at least one initial image processed, or to be processed, by the system under the control of a user, who it is envisaged will be an artist unfamiliar with the workings of computers and associated technologies.

The storage device 2 stores an image in the form of pixel data and is generally stored in a format determined by the manufacturer of the device. The bulk storage device 2 may be for example a Fujitsu disc pack or a Sony digital video tape recorder. Pixel data representing the initial image is read from the storage device 2 and held in an image framestore 3. It will be appreciated that an interface (not shown) may be provided between the storage device 2 and the framestore 3 to convert the pixel data into the appropriate format for storage in the framestore 3. Other buffers and the like may also be required in other parts of the system 1 to facilitate the transfer of data around the system because different stages may operate at different rates, but all such buffers are omitted from the accompanying drawings for the sake of clarity.

Where a wholly new image is to be created by the user solely utilising his skill as an artist, the image data initially held in the framestore 3 will be such as to represent say a blank sheet of paper or screen. Such data may be in the form of data representing a blank screen (typically having a zero intensity value) or a white screen (typically having a maximum intensity value). Of course any other colour of background can be written into the framestore 3, if required.

Image data in the framestore 3 is read continuously and non-destructively by a combiner 4. The image data is read serially from the framestore 3 in raster sequence. The combiner 4 continuously updates a colour display monitor 5 with picture information derived from the image data and from colour data representing a user selected colour held in a colour register 6, as will be described in greater detail hereinafter.

The system 1 also includes a stylus/touch tablet device 7 by which the user can paint into the image displayed on the monitor 5. As the stylus is brought into the proximity of the touch tablet a signal XY is generated by the touch tablet. The XY signal is representative of the instantaneous position of the stylus in terms of X and Y co-ordinates on the touch tablet. The XY signal is output to a patch address generator 8 which converts the point address into a patch of addresses covering an area or patch including a framestore address corresponding to the co-ordinate X,Y. A series of X,Y addresses are generated as the stylus is moved around the touch tablet. The stylus includes a pressure sensor and outputs a pressure related signal when the stylus is brought into contact with the touch tablet, which signal is stored as a value in a stylus pressure register 9 from time to time.

The artist using the system is provided with a choice of notional implements with which to paint symbols representing a range of different implements can be displayed as a menu of options (not shown) on the monitor 5 and the user can select an implement by moving a cursor (also not shown) over the appropriate symbol by way of manipulation of the stylus on the touch tablet. When an implement is selected, information representing the shape of the implement is held in a brush shape memory 10. The information held in the brush shape memory 10 may be numerical values representing a continuous three-dimensional shape covering a patch of image pixels or it may be a mathematical expression from which such values can be derived. The brush profile will typically be similar to that shown in our abovementioned British Patent No. GB 2,089,625 and corresponding U.S. Pat. No. 4,514,818. In this way, pixels at or near to the edge of the implement will receive a lesser contribution (lower height) than will pixels at or near to the centre of the implement. Also, the brush profile is defined at a resolution greather than that of the control image, thereby enabling the position of the patch in the control image store 14 to be defined at sub-pixel resolution. Thus, the position of the brush is defined at any one of, say, 64 positions with respect to the centre of the pixel in which the brush profile is located. The effect of this is to vary slightly the contribution made to pixels at the edge of the patch depending on the amount by which the patch overlaps each pixel.

The patch address generator output signal is supplied to the stylus pressure register 9 and the brush shape register 10 to synchronise addressing of these registers with framestore addressing. Data output from the stylus pressure register 9 and the brush shape register 10 are multiplied together to produce a brush coefficient $K_B$ by a multiplier 11. The brush coefficients $K_B$ for the pixels in the patch defined by the patch address generator are held temporarily in a brush coefficient store 12. The brush coefficient store 12 also is addressed by the signal from the patch address generator 8.

Brush coefficient data $K_B$ from the coefficient store 12 is output to one input of a comparator 13. The comparator also receives control image data K from a control image store 14.

The control image store 14 is used to store data representing a desired distribution of coefficients K, and if displayed could be a monochrome image of the control image K painted by the user. Initially, when a colour is first selected by the user, the control image store 14 will contain data representing a blank screen, the pixels notionally having a uniform minimum value of K. The control image store 14, which is a random access store, is also addressed by the patch address generator 8 to define a patch of control image data K at a location corresponding to a patch including the instantaneous position of the stylus on the touch tablet. The patch of control image data K is read from the image store 14 and input to the comparator and compared with the data $K_B$ from the brush coefficient store 12. At this stage of the operation, the control image data K is not altered in any way as a result of the comparison.

The comparator 13 outputs a signal dependent on the relationship between the control image data K and the brush coefficient data $K_B$, which output signal is used to control a gate 15 connected between the brush coefficient store 12 and the control image store 14. The comparator 13 and the gate 15 are arranged such that the gate 15 only connects the output from the brush coefficient store 12 to the control image store 14 when the value of a brush coefficient pixel $K_B$ is greater than that of the corresponding control image pixel. When these conditions are met the brush coefficient $K_B$ is written to the control image store 14 replacing the control image data K previously at the addressed store location. As the control image is drawn, existing data is only replaced by new data if the new data has a greater value (corresponding to a greater intensity) than the original data. Thus, for example the K values of a line drawn by the brush will be maximum along the axis of the line and will tend to zero in a direction perpendicular to the axis, assuming that the brush profile has circular symmetry.

The control image data drawn into the store 14 therefore comprises the necessary K value distribution to achieve anti-aliassing when the foreground image data is combined by interpolation with the background image data.

Control image data K from the control image store 4 is read continuously and non-destructively in raster sequence by the combiner 4. The reading of the control image store 14 and of the image framestore 3 is synchronised so that corresponding pixels from both stores are supplied at the same time to the combiner 4. The combiner 4 operates on a pixel-by-pixel basis to combine image data I with user selected colour data C in a linear interpolation under the control of the control data K. The resulting data, which is defined by the expression $KC+(1-K)I$, is output for display on the monitor 5. Thus, as the user paints or draws using the stylus and touch tablet 7 a control image is created in the control image store 14 and resulting modifications are effected only to the image displayed on the monitor 5. The image data held in the image framestore 3 remains unaltered during this mode of operation thus enabling real time previewing of the image before committing the image to the displayed modification.

Once the artist is satisfied with his alterations effected to the background image by the control image as displayed, a once only commital operation is performed by the combiner 4 on the image data in the framestore 3. Image data I is first read from the framestore 3 and is then combined with the colour data C under the control of the control image K as above described in respect of the displayed image. The thus combined image data is then written back to the image framestore 3 replacing the initial image data originally stored therein. The system is thus arranged to modify the image data in the image framestore in a once only read-modify-write operation. The data control image store 14 is then reset to a zero value corresponding to a blank screen or is otherwise erased in preparation for drawing with a new colour. This modification operation may be made user selectable by the display of appropriate options on a menu or the system may be arranged to perform the operation automatically any time a new colour is selected by the artist for example.

The above described embodiment of the invention provides a system in which an artist can watch the effect of his painting on the monitor 5 without making any changes to the image in the image store 3 because only the control image held in the control image store 14 is changed as the artist paints. Only when the artist is satisfied with his painting is the image data in the image framestore 3 updated by effectively feeding back the output of the combiner 4 to the framestore 3. Put another way, the storage of the modified image in the framestore 3 may be regarded as grabbing the image as seen on the monitor 5 at the instant (frame period) at which the artist indicates his satisfaction of the displayed image.

This process of drawing is repeated for each and every colour that the artist wishes to use with the data in the image framestore 3 being updated and the control image store 14 being cleared when the artist changes colour or otherwise indicates that he has finished painting.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

For example, the Z-paint algorithm could simply be replaced with any other painting algorithm provided that it relates to a circularly symmetrical brush.

We claim:

1. An electronic graphic system for use in modifying data defining an image, in which graphic system control data representing a desired distribution of interpolation coefficients is created and stored in a control store by way of a binary algorithm in which stored control data in the control store is compared with created control data created in response to manipulations of user operable input means via a comparator and is replaced with the created data via a gate when the created control data is greater than the stored control data so that the created data becomes the stored data; the stored control data stored in the control store being used to control the combining by interpolation of data representing a user selected color with data representing an initial image held in an image framestore separate from the control store to produce combined data; and the combined data being output for display of a modified image represented thereby on a monitor, the system being arranged such that the initial image data stored in the image framestore remains unmodified until such time as the user indicates his satisfaction with the displayed image.

2. An electronic graphic system as claimed in claim 1, wherein the user operable input means comprises a stylus and touch tablet for generating co-ordinate data corresponding to the position of the stylus on the touch tablet to thereby identify a corresponding location in the control store.

3. An electronic graphic system as claimed in claim 2, wherein the stylus is pressure sensitive and outputs a pressure data relating to the pressure of the stylus on the touch tablet from time to time.

4. An electronic graphic system as claimed in claim 3, wherein a patch of created control data is created in response to manipulations of the stylus on the touch tablet, the patch of created control data being compared pixel by pixel with a corresponding patch of stored control data to determine the relationship therebetween.

5. An electronic graphic system as claimed in claim 4, further comprising a brush shape memory for storing data defining the form of a notional implement selectable by a user, the pressure data and the form data being combined to create the patch of created control data.

6. An electronic graphic system as claimed in claim 1, wherein the stored control data is replaced by the created control data if the created control data has a value greater than that of the stored control data.

7. An electronic graphic system as claimed in claim 1, further comprising a combiner for combining the initial image data and the user selected color data, the stored control data being used by the combiner on a pixel by pixel basis in combining the initial image data and the color data.

8. An electronic graphic system as claimed in claim 1, wherein when the user selects a different color the initial image data in the image framestore is modified by the previously selected color data under the control of the stored control data and the stored control data is then erased from the control store.

9. A method of modifying data defining an image, the method comprising: storing said data defining an image in an image store; creating control data representing a desired distribution of interpolation coefficients and storing said control data in a control store by way of a binary algorithm in which stored control data in the control store is compared with created control data created in response to the manipulation of user operable input means via a comparator and is replaced with the created control data via a gate when the created control data is greater than the stored control data so that the created data becomes the stored data; selecting data representing a color; combining the image data from the image store with the selected color data in accordance with the stored control data stored in the control store to create combined image data; displaying on a monitor an image derived from the combined image data, the image displayed on the monitor thus changing as said stored control data is replaced by the created control data created in response to said manipulation of said user operable input means; and replacing the data in the image store with the combined image data once an image containing acceptable modifications is displayed on the monitor.

10. A method as claimed in claim 9, further comprising selecting a notional drawing implement from a predefined range of such implements; storing implement profile data representing the profile of a selected implement; and deriving said created control data from the implement profile data.

11. A method as claimed in claim 10, wherein said user operable input means provides pressure related data; the method further comprising deriving implement coefficient data from said pressure data and said implement profile data for use as said created control data.

12. A method as claimed in claim 9, wherein the stored control data is replaced with the created control data when the value of the created control data is greater than that of the stored control data.

13. A method as claimed in claim 9, further comprising updating the image data with the combined data when a change is made to the selected color.

14. An image processing apparatus comprising:
an image framestore for storing data defining an initial image to be modified;
a control image framestore for storing control image data defining a control image;
storage means for storing data representing a user selected color;
user operable input means responsive to user manipulations for generating implement data representing a notional drawing implement selected by the user and co-ordinate data for identifying control image data stored in the control image framestore at locations corresponding to the position of the notional implement in the control image;
a binary algorithm in which the implement data is compared via a comparator with stored control image data identified by the co-ordinate data and for replacing the stored control image data with the implement data via a gate when the implement data is greater than the stored control image data so that the implement data becomes the stored control image data at the identified co-ordinate; and
a combiner responsive on a pixel by pixel basis to the stored control image data for combining by interpolation the color data with the initial image data for display as a modified image on a monitor, and for effecting corresponding modifications to the initial image data in the image framestore in response to a user selected command to commit to the modification.

15. An image processing apparatus as claimed in claim 14, wherein the stored control image data is used as an interpolation coefficient in interpolating the color data and the initial image data.

16. An image processing apparatus as claimed in claim 14 or 15, wherein the user operable input means comprises a stylus and touch tablet, said stylus generating pressure data related to the pressure applied by the stylus to the touch tablet, which pressure data is combined with profile data to form said implement data.

17. An image processing apparatus as claimed in claim 14, wherein the comparing means is arranged to replace the stored control image data with the implement data if a value associated with the control image data is less than a value associated with the implement data.

18. An image processing apparatus as claimed in claim 14, wherein the combiner is arranged to effect modifications to the initial image data in the image framestore data when a new color is selected by the user and wherein the data in the control image store at the time the new color is selected being erased once said modification has been effected.

19. An image processing apparatus as claimed in claim 14, further comprising a bulk storage device for storing at least said data defining an initial image to be modified.

20. A graphic system comprising:
   user manipulable input means for providing brush data representing the position and form of a circularly symmetric brush;
   processing means responsive to said brush data for using a binary algorithm to generate a representation of a desired distribution of interpolation coefficients;
   first store means for storing the representation of the desired distribution, the binary algorithm used by said processing means being responsive to said user manipulable input means to compare said brush form data with respective interpolation coefficients in said first store means at positions identified by said brush position data via a comparator and to replace the coefficients in said first store means with the corresponding brush data via a gate when the brush data has a value greater than that of the corresponding coefficient in said first store means;
   a source for providing a representation of an artist selected color;
   second store means for storing a representation of an initial image;
   reading means for serially reading the representations in said first and second store means;
   interpolating means for combining by interpolation the representation of the artist selected color with said image representation in proportions determined by respective coefficients of the desired distribution to produce a representation of a combined image;
   monitor means for displaying the combined image; and
   user operable means for writing the representation of the combined image in said second store means.

21. A graphics system as claimed in claim 20, wherein said user operable means is responsive to a new color being selected from said color source.

22. A graphics system as claimed in claim 20 or 21, wherein the brush data representing the form of the brush defines respective data representing new interpolation coefficients.

23. A method comprising the steps of:
   providing user input representative of a localized parameter of control image;
   using a binary algorithm to match a corresponding parameter of a control image with the user input via a comparator and selectively modifying the control image via a gate in accordance with the user input when the user input is greater than the corresponding parameter of the control image so that the user input becomes the corresponding parameter of the control image;
   providing a color signal related to a selected color;
   combining the color signal with a pixel image stored in an image store, in accordance with corresponding parameters of the control image, to derive a modified pixel image;
   displaying the modified pixel image; and
   selectively replacing the pixel image in the image store with said modified pixel image.

24. A method as in claim 23 in which the replacing step comprises replacing the pixel image in the image store with the modified pixel image in response to changing said selected color from one color to another.

25. A method as in claim 24 in which the replacing step comprises replacing the pixel image in the image store with the modified pixel image in response to a user command different from changing said selected color from one color to another.

26. A method as in claim 24 in which the replacing step comprises replacing the pixel image in the image store with the modified pixel image in response to each of:
   (i) changing said selected color from one color to another; and (ii) a command pertaining to a parameter different from defining said selected color.

27. A system comprising:
   a control image store for storing a pixel-based control image;
   a second image store for storing a pixel-based second image;
   a first source of user input representative of a localized parameter;
   a matching circuit coupled with said first source and said control image store to receive as inputs said localized parameter and a portion of the control image positionally corresponding localized parameter and, to match said localized parameter and said portion of the control image using a binary algorithm via a comparator to selectively modify a portion of the control image stored in the control image store via a gate when the localized parameter is greater than the corresponding control image stored in the control image store.
   a second source of user input representative of a selected color;
   a combiner coupled with the control image store, with said second image store and with said second source to receive therefrom the control image and the second image and the selected color and to combine the selected color with the second image in proportions and at locations controlled by the control image stored in the control image store to thereby generate a modified second image;
   a display coupled with the combiner to receive therefrom and to display said modified second image; and
   an updating circuit selectively replacing the contents of the second image stored with said modified second image.

28. A system as in claim 27, wherein the updating circuit comprises a circuit responsive to a user input from the second source representative of a change in the selected color to replace the contents of the second image store with said modified second image.

29. A system as in claim 28, wherein the updating circuit comprises a circuit responsive to a user input other than an input representative of a change in the selected color to replace the contents of the second image store with said modified second image.

30. A system as in claim 27, wherein the updating circuit comprises a circuit responsive to either of a user input from the second source representative of a change in the selected color and an additional user input to replace the contents of the second image store with said modified second image.

* * * * *